United States Patent
Barthur et al.

(10) Patent No.: US 10,924,593 B2
(45) Date of Patent: Feb. 16, 2021

(54) VIRTUALIZATION WITH DISTRIBUTED ADAPTIVE MESSAGE BROKERING

(71) Applicant: Xaptum, Inc., Chicago, IL (US)

(72) Inventors: Pradeep Srinivas Barthur, White Plains, NY (US); David Robinson Bild, Chicago, IL (US); Zane Van Beckwith, Chicago, IL (US); Gary W. Grube, Barrington Hills, IL (US); Mario Frank DeRango, Cary, IL (US)

(73) Assignee: Xaptum, Inc., Chicago, IL (US)

( * ) Notice: Subject to any disclaimer, the term of this patent is extended or adjusted under 35 U.S.C. 154(b) by 0 days.

(21) Appl. No.: 16/549,754

(22) Filed: Aug. 23, 2019

(65) Prior Publication Data
US 2020/0076927 A1 Mar. 5, 2020

Related U.S. Application Data

(60) Provisional application No. 62/725,663, filed on Aug. 31, 2018.

(51) Int. Cl.
| | |
|---|---|
| *G06F 15/16* | (2006.01) |
| *H04L 29/06* | (2006.01) |
| *H04L 12/24* | (2006.01) |

(52) U.S. Cl.
CPC ........ *H04L 69/163* (2013.01); *H04L 41/0846* (2013.01); *H04L 41/0873* (2013.01); *H04L 41/0893* (2013.01); *H04L 69/18* (2013.01)

(58) Field of Classification Search
CPC ... H04L 69/163; H04L 69/18; H04L 41/0846; H04L 41/0873; H04L 41/0893
(Continued)

(56) References Cited

U.S. PATENT DOCUMENTS 5,039,980 A * 8/1991 Aggers ................ H04L 43/00
340/506
5,410,475 A 4/1995 Lu
(Continued)

FOREIGN PATENT DOCUMENTS

| EP | 0931418 A2 | 7/1999 |
| EP | 1856602 A2 | 11/2007 |

(Continued)

OTHER PUBLICATIONS

Handley, et al., SIP: Session Initiation Protocol, Mar. 1999, www. rfc-base.org., RFC2543.
(Continued)

*Primary Examiner* — Moustafa M Meky
(74) *Attorney, Agent, or Firm* — Garlick & Markison; Gary W. Grube

(57) ABSTRACT

A method includes a first computing entity editing an entry in a first copy of a common responsibility list of a proprietary network, where the entry includes information regarding the first computing entity's service responsibility for a first user computing device. The method further includes the first computing entity sending at least the edited entry to other computing entities. The method further includes the first computing entity receiving at least a second edited entry from a second computing entity. The method further includes the first computing entity updating the first copy of the common responsibility list with the at least the second edited entry.

19 Claims, 10 Drawing Sheets

(58) Field of Classification Search
USPC .......................................................... 709/227
See application file for complete search history.

(56) References Cited

U.S. PATENT DOCUMENTS

| | | | |
|---|---|---|---|
| 5,940,835 A * | 8/1999 | Sit ....................... | G06F 16/9017 |
| 5,978,386 A | 11/1999 | Haemaelaneinen | |
| 6,097,794 A | 8/2000 | Suffern | |
| 6,430,184 B1 | 8/2002 | Robins | |
| 6,442,567 B1 * | 8/2002 | Retallick ............ | G06Q 10/0633 |
| | | | 707/999.003 |
| 6,651,099 B1 | 11/2003 | Dietz | |
| 6,661,431 B1 | 12/2003 | Stuart | |
| 6,667,700 B1 | 12/2003 | McCanne | |
| 6,721,333 B1 | 4/2004 | Milton | |
| 6,859,835 B1 | 2/2005 | Hipp | |
| 7,120,790 B1 | 10/2006 | Lopresti | |
| 7,236,938 B2 * | 6/2007 | Shan ....................... | H04L 43/08 |
| | | | 705/7.11 |
| 7,319,847 B2 | 1/2008 | Xanthos | |
| 7,467,198 B2 * | 12/2008 | Goodman ............. | G06Q 10/10 |
| | | | 709/223 |
| 7,590,715 B1 | 9/2009 | Raanan | |
| 8,073,973 B2 | 12/2011 | McCann | |
| 8,291,058 B2 | 10/2012 | Head | |
| 8,321,434 B1 | 11/2012 | Ren | |
| 9,887,911 B2 | 2/2018 | Pasam | |
| 10,614,393 B2 * | 4/2020 | Jagota ................ | G06F 16/9535 |
| 2002/0085575 A1 | 7/2002 | Smith | |
| 2002/0176378 A1 | 11/2002 | Hamilton | |
| 2003/0140140 A1 | 7/2003 | Lahtinen | |
| 2004/0128552 A1 | 7/2004 | Toomey | |
| 2005/0005145 A1 | 1/2005 | Teixeira | |
| 2006/0092930 A1 | 5/2006 | Shah | |
| 2006/0126510 A1 | 6/2006 | Russell | |
| 2006/0170961 A1 * | 8/2006 | Saijo ..................... | G06F 3/1205 |
| | | | 358/1.15 |
| 2007/0195780 A1 | 8/2007 | Cabeca | |
| 2007/0250382 A1 * | 10/2007 | Beck ....................... | G06Q 30/00 |
| | | | 705/14.21 |
| 2008/0115149 A1 | 5/2008 | Rupp | |
| 2009/0063625 A1 | 3/2009 | Bagepalli | |
| 2009/0070779 A1 | 3/2009 | Wang | |
| 2009/0097506 A1 | 4/2009 | Subrahmanyan | |
| 2009/0168760 A1 | 7/2009 | Katis | |
| 2009/0199210 A1 | 8/2009 | Smith, Jr. | |
| 2009/0222590 A1 | 9/2009 | Van Aken | |
| 2009/0323703 A1 | 12/2009 | Bragagnini | |
| 2009/0323718 A1 | 12/2009 | Oren-Dahan | |
| 2010/0023524 A1 | 1/2010 | Gladwin | |
| 2010/0095367 A1 | 4/2010 | Narayanaswamy | |
| 2010/0233961 A1 | 9/2010 | Holden | |
| 2011/0070868 A1 | 3/2011 | Scholz | |
| 2011/0145181 A1 | 6/2011 | Pandya | |
| 2011/0228744 A1 | 9/2011 | Cai | |
| 2011/0264657 A1 | 10/2011 | Hoffman | |
| 2012/0102055 A1 | 4/2012 | Hu | |
| 2012/0120967 A1 | 5/2012 | Ghiasi | |
| 2012/0210426 A1 | 8/2012 | Yu | |
| 2012/0253728 A1 | 10/2012 | Chamas | |
| 2013/0094451 A1 | 4/2013 | Pavlovski | |
| 2013/0111217 A1 | 5/2013 | Kopasz | |
| 2013/0136127 A1 | 5/2013 | Hill | |
| 2013/0211555 A1 | 8/2013 | Lawson | |
| 2013/0304616 A1 | 11/2013 | Raleigh | |
| 2013/0322626 A1 | 12/2013 | Yang | |
| 2014/0006632 A1 | 1/2014 | Evens | |
| 2014/0028462 A1 | 1/2014 | Lawson | |
| 2014/0280829 A1 | 9/2014 | Kjendal | |
| 2015/0156266 A1 | 6/2015 | Gupta | |
| 2016/0119198 A1 | 4/2016 | Kfir | |
| 2016/0210578 A1 | 7/2016 | Raleigh | |
| 2017/0026469 A1 | 1/2017 | Usgaonkar | |
| 2017/0316361 A1 * | 11/2017 | Jagota ............. | G06Q 10/06313 |
| 2018/0026873 A1 | 1/2018 | Cheng et al. | |

FOREIGN PATENT DOCUMENTS

| | | |
|---|---|---|
| EP | 1446906 B1 | 12/2007 |
| WO | 0049481 A2 | 8/2000 |

OTHER PUBLICATIONS

International Search Report corresponding to International Patent Application Serial No. PCT/US14/19595, United States Patent and Trademark Office, dated Feb. 28, 2014; (4 pages).

International Written Opinion corresponding to International Patent Application Serial No. PCT/US14/19595, United States Patent and Trademark Office, dated Feb. 28, 2014; (5 pages).

* cited by examiner

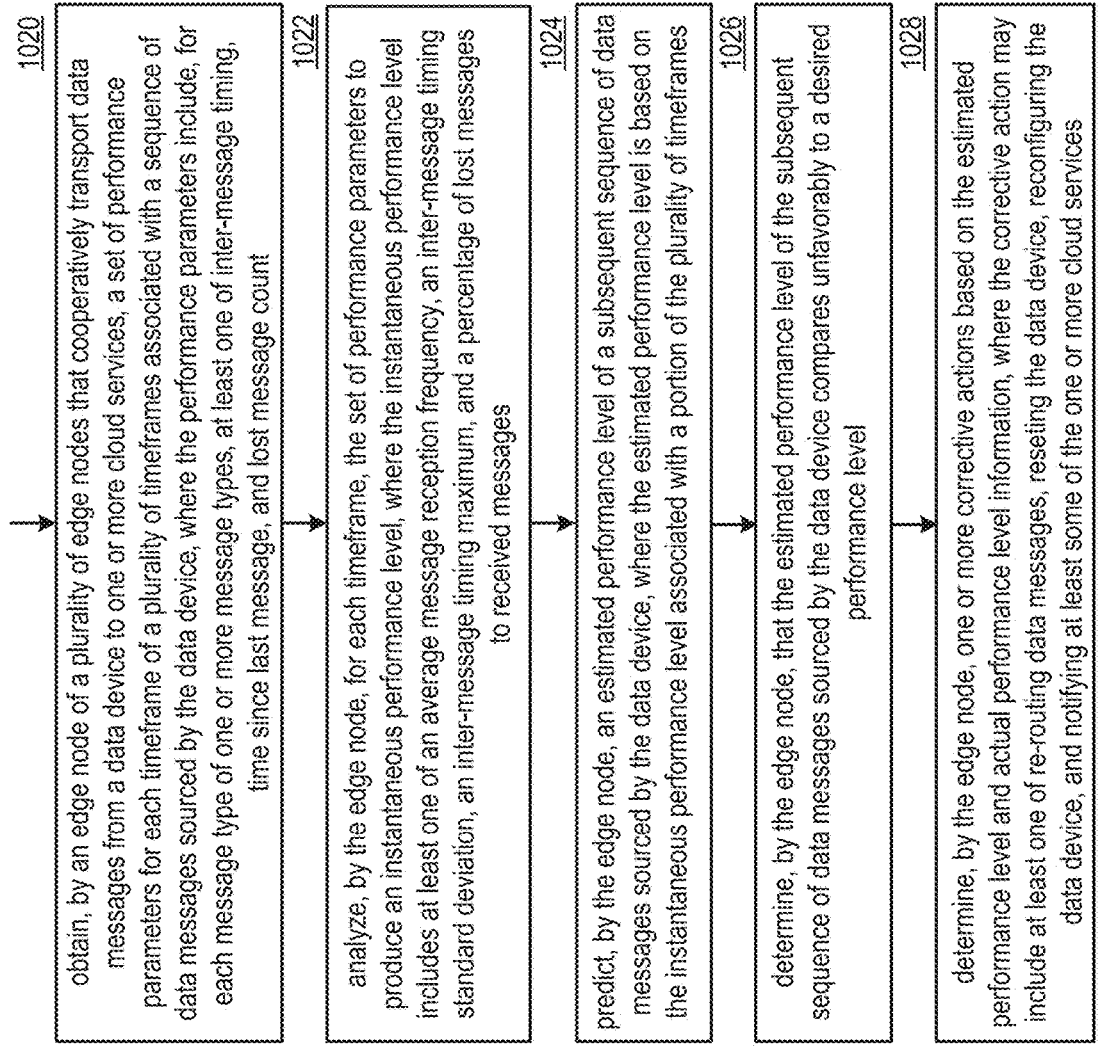

VIRTUALIZATION WITH DISTRIBUTED ADAPTIVE MESSAGE BROKERING

CROSS REFERENCE TO RELATED PATENTS

The present U.S. Utility Patent Applications claims priority pursuant to 35 U.S.C. § 119(e) to U.S. Provisional Application No. 62/725,663, entitled "VIRTUALIZATION WITH DISTRIBUTED ADAPTIVE MESSAGE BROKERING," filed Aug. 31, 2018, which is hereby incorporated herein by reference in its entirety and made part of the present U.S. Utility Patent Applications for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to data communication systems.

Description of Related Art

The use of computers to communicate text files, voice files, multimedia files, and even live data streaming is known. Most computers utilize the Internet protocol (IP) to communicate via the Internet. The Internet protocol is known to be the primary network communications protocol utilized on the Internet, where IP provides a network layer protocol in accordance with one or more industry standards such as transmission control protocol (TCP), user datagram protocol (UDP), and stream control transmission protocol (SCTP).

It is also known for computers to utilize a transport protocol on top of the network layer protocol to transport data between computing devices, where the transport protocol is in accordance with one or more industry standard session protocols such as hypertext transfer protocol (HTTP) and Message queue telemetry transport (MQQT). Further industry standards have resulted in a focus on so-called constrained devices where lower power devices and lossy networks may be joined by the Internet. One such resulting industry standard is the constrained application protocol (CoAP) which provides a service layer protocol over the session protocol HTTP over the network layer protocol UDP. Computers are generally required to understand the protocol and data format from the various devices connected to the same network.

BRIEF DESCRIPTION OF THE SEVERAL VIEWS OF THE DRAWING(S)

Figure 6:
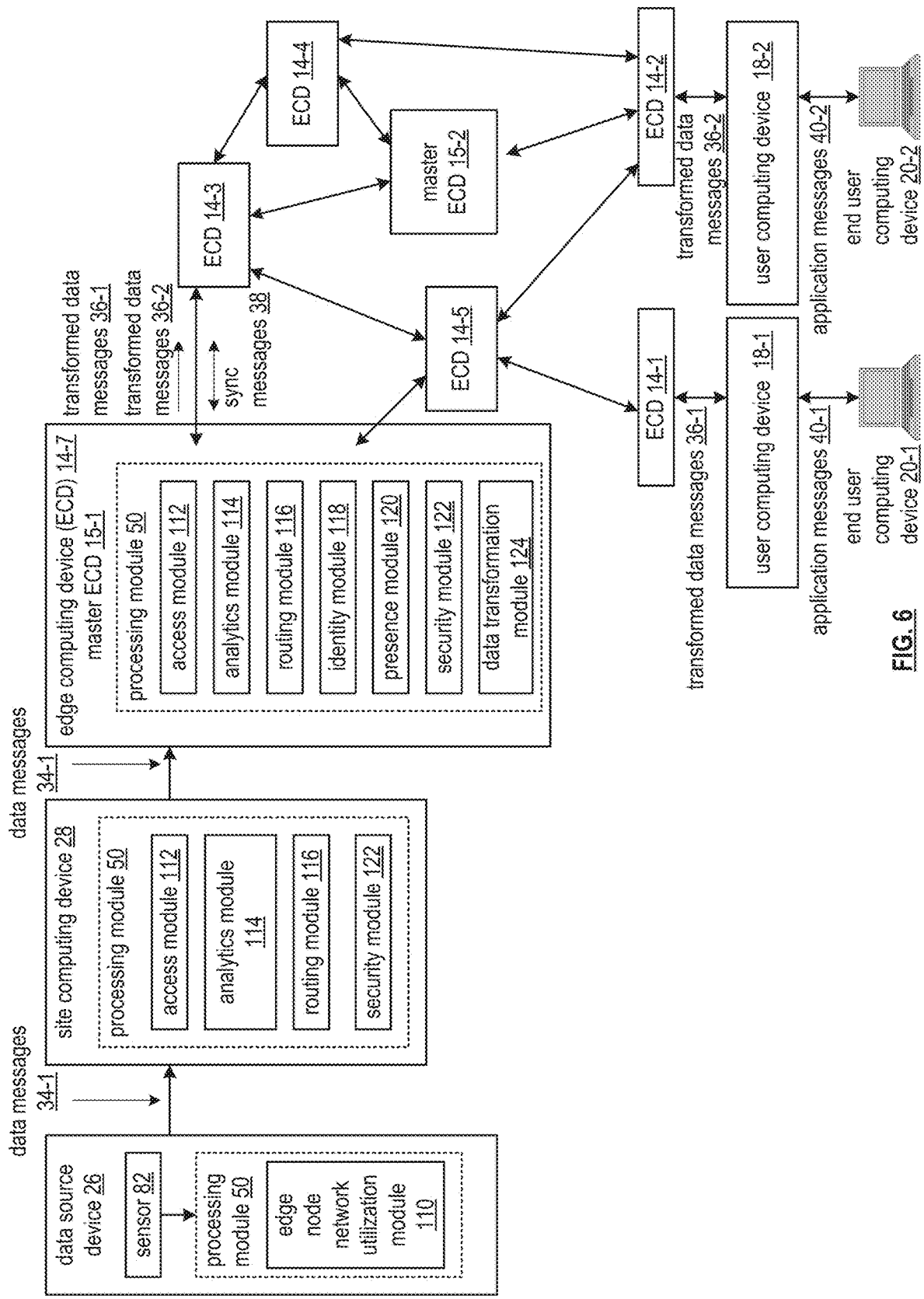
Figure 7A:
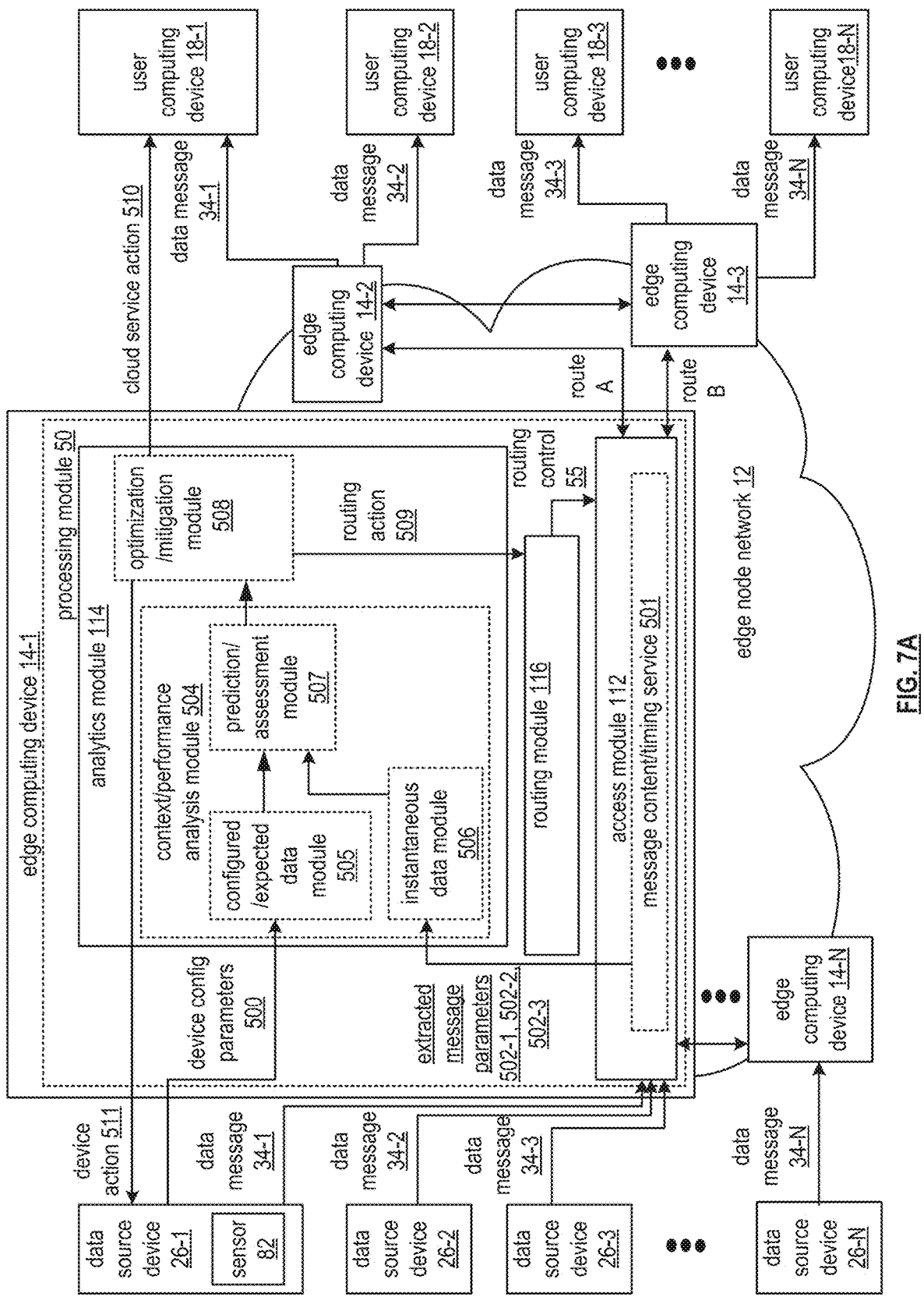

FIGS. 5A, 5B, 5C, and 5D are schematic block diagrams of embodiments of a proprietary network illustrating methods to communicate data messages in accordance with the present invention;

FIG. 6 is a schematic block diagram of another embodiment of a proprietary network in accordance with the present invention;

FIG. 7A is a schematic block diagram of additional embodiments of a proprietary network in accordance with the present invention; and FIG. 7B is a logic diagram of an embodiment of a method for multi-dimensional real-time context analysis in accordance with the present invention.

DETAILED DESCRIPTION OF THE INVENTION

Figure 1:
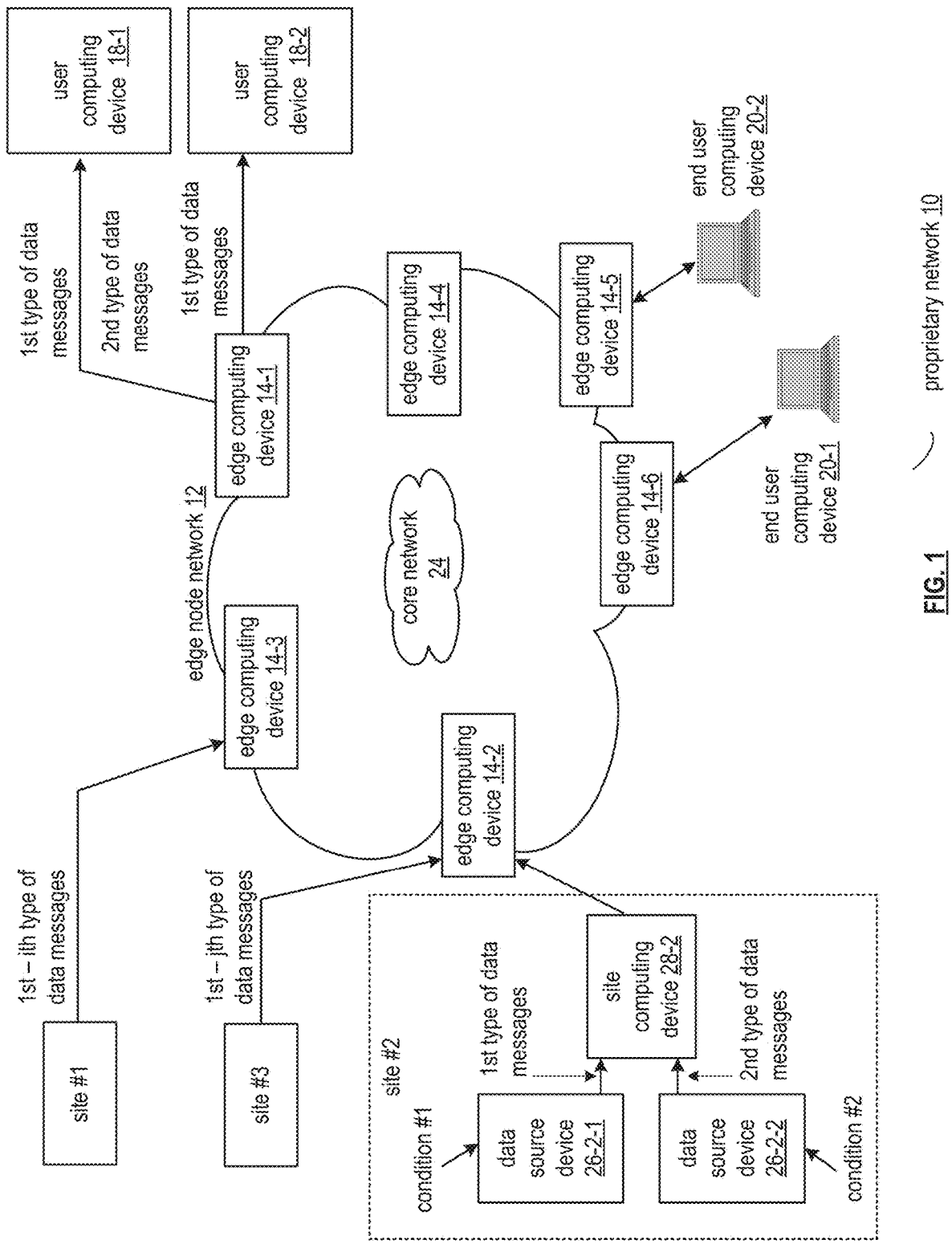
FIG. 1 is a schematic block diagram of an embodiment of a proprietary network in accordance with the present invention.

FIG. 1 is a schematic block diagram of an embodiment of a proprietary network 10 that includes an edge node network 12, a plurality of sites #1 through #3, a core network 24, a plurality of user computing devices 18-1 through 18-2, and a plurality of end user computing devices 20-1 through 20-2. The core network 24 includes at least one of the Internet, a public radio access network (RAN), and any private network. The edge node network 12 includes a plurality of edge computing devices 14-1 through 14-6 which utilize the core network 24 to communicate with each other.

Alternatively, the edge computing devices may communicate directly with each other by utilizing various access technologies including one or more of T-carrier/E-carrier (T1/E1), Digital Subscriber Line (DSL), Metro Ethernet, Hybrid Fiber Coax (HFC), and optical fiber. For instance, a transport protocol such as Multiprotocol Label Switching (MPLS), Asynchronous Transport Mode (ATM), or frame relay provides communications between distant edge computing devices over the access technology.

The sites include one or more data source devices and a site computing device for monitoring various conditions within a geographic area associated with each site. Each site may be associated with at least a portion of a facility (e.g., a home, an apartment, a store, a school, a hospital, a hotel, an office, a factory, a refinery, a farm plot, an airport, a water treatment plant, electrical generation and/or transmission complex, an oil exploration facility, etc.). For example, site #2 includes site computing device 28-2 and data source devices 26-2-1 and 26-2-2.

Each data source device is capable of detecting at least one condition, generating data based on the condition (e.g., on both a continual basis or when requested), and sending the data as data messages to an associated site computing device. The site computing device temporary stores and shares, via the edge node network 12, the data messages with various user computing devices and end user computing devices. The site computing device determines which of the various user computing devices and end user computing devices to share the data with based on authorized requests for the data and a common responsibility list.

The data includes one or more of sensor data associated with the condition of a local environment (e.g., a site) and use data (e.g., statistical usage data, user identifiers, error messages, alerts, warnings, level information, etc.) associated with a mechanism (e.g., a machine, a local computer, etc.). The sensor data further includes raw sensor data (e.g., directly from the sensor) and an interpretation of the raw sensor data (e.g., a summary, a result of applying an algorithm to the raw sensor data). The data still further includes data retrieved from a memory device associated with the data source device and any other data produced by the data source device.

The data source device generates the data messages by type. The type includes an association with a particular type of data such as error code data, weather data, smart grid control data, etc. The various types of data are associated with various priority levels. The priority level includes an absolute priority level and a relative priority level (e.g., two other data types). The priority level is utilized to establish a performance level of sending the data messages from the data source device to the user computing device (e.g., user computing devices and end user computing devices).

The performance includes a variety of performance factors associated with delivery of the data messages. The performance factors include transmission speed (e.g., transmission latency) and transmission bandwidth (e.g., message capacity) through the proprietary network 10. In a first embodiment of prioritizing performance, a priority level for a particular data type has an associated desired performance level. For example, when the data is of a first type of data message (e.g., real-time smart grid information), the transmission latency has a desired transmission time (e.g., a goal for an elapsed time from receipt of the data message to delivery of the data message to the user computing device) of 20 ms. As another example, when the data is of a second type of data message (e.g., home appliance usage information), the transmission latency has a second desired transmission time of 200 ms.

In a second embodiment of prioritizing performance, the desire performance level is a function of a requirement of the recipient computing device. For example, the user computing device 18-1 has a desired transmission time for the first type of data messages (e.g., the real-time smart grid information) of 20 ms and the user computing device 18-2 has a desired transmission time for the same first type of data messages of 50 ms.

The edge computing devices of the edge node network 12 route the requests for the data from the user computing devices and the end user computing devices to the site computing devices. The edge computing devices further routes the data from the site computing devices to the user computing devices and end user computing devices associated with the requests for the data and the common responsibility list.

The routing by the edge computing devices is based on various authentication and authorization techniques to ensure that only authorized user computing devices (e.g., end user computing devices and/or user computing devices) are allowed to access data from the data source devices. Thus, the edge node network 12 provides additional data transport security beyond the core network 24.

The user computing devices 18-1 and 18-2 request the data and process the data to produce process data. The processing of the data includes executing various data applications utilizing the data, storing the data, utilizing the data as inputs to an operational control system to provide a service, and using the data in a hosted data application. The requesting of the data is in accordance with needs of the various applications and services.

The end user computing devices 20-1 and 20-2 request the data and further request results of processing of the data by the user computing devices. For example, the end user computing devices control the various data applications hosted by the user computing devices and receive results of execution of the data applications (e.g., receive processed data).

The site computing devices, edge computing devices, user computing devices and end user computing devices may be implemented with a computing entity. A computing entity includes a cluster of one or more computing devices. For example, a first computing entity may be implemented to include the site computing device 28-2 and the edge computing device 14-2.

Figure 2:
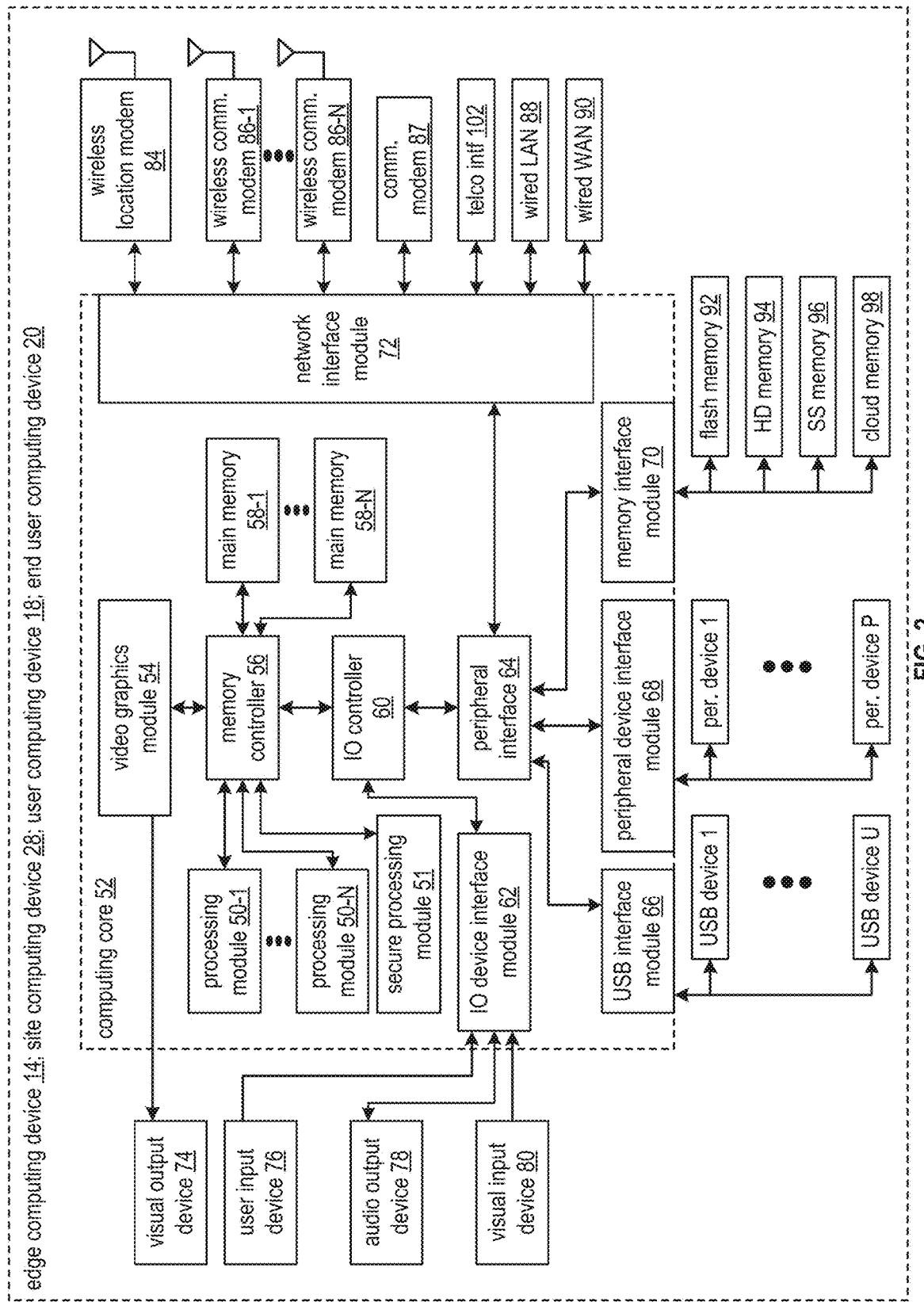
FIG. 2 is a schematic block diagram of various computing devices of a proprietary network in accordance with the present invention.

Each computing device includes one or more computing cores and each computing core includes one or more processing modules along with memory and input/output support devices and/or modules as illustrated in FIG. 2. In general, a computing core is any electronic device that can communicate data, process data, and/or store data.

Computing devices include portable computing devices and fixed computing devices. Examples of portable computing devices include an embedded controller, a smart sensor, a social networking device, a gaming device, a smart phone, a laptop computer, a tablet computer, a video game controller, and/or any other portable device that includes a computing core. Examples of fixed computing devices include a personal computer (PC), a computer server, a cable set-top box, a satellite receiver, a television set, a printer, a home appliance, home entertainment equipment, a security camera controller, a video game console, a critical infrastructure controller, and/or any type of home, office or cloud computing equipment that includes a computing core.

The proprietary network 10 generally supports secure routing of the data from the sites to the user computing devices based on security procedures, synchronization parameters, and configuration information. For example, a first computing entity receives the data from a data source device and forwards the data to an intermediate computing entity of the edge node network 12 in accordance with a local copy the common responsibility list. The intermediate computing entity further forwards the data to a second computing entity in accordance with another local copy the common responsibility list. The second computing entity forwards the data to a user computing device in accordance with yet another local copy the common responsibility list.

Each computing entity has a particular responsibility to a user computing device with regards to the forwarding of the data. For example, the second computing entity is responsible for processing data (e.g., subscription) requests from the user computing device to update its local copy of the common responsibility list and to update other computing entities of the requests. All of the computing entities are further responsible for forwarding subscribed data to the user computing device in accordance with a local copy of the common responsibility list.

The security procedures includes identifying computing devices, challenging identity through authentication, producing encryption keys, securely exchanging authentication information, encrypting computing device identifiers, and encrypting data for transmission, while preserving device anonymity when desired. The encrypting of the data includes utilization of encryption keys with an encryption algorithm.

The synchronization parameters include one or more of control information, configuration information, and analytics information. The control information includes operational mode information and routing information (e.g., routes). The operational mode information includes how a computing device is to operate, i.e. as an edge computing device and/or as a site computing device. The operational mode information further includes which functions are to be supported by the computing device (e.g., routing, security, ingress support, egress support, pass-through support).

The configuration information includes deployment information, software information, security information, routing information, addressing information, protocol information, and presence information. The deployment information includes lists of logical connection paths between edge computing devices, data source devices associated with a particular edge computing device or site computing device, data source devices associated with particular user computing devices, data source devices associated with particular applications and/or storage facilities of a particular user computing device, etc.

The software information includes software version lists and software for site computing devices and edge computing devices. The security information includes public-private encryption keys, key generation values, key seeds, key identifiers, encryption algorithm identifiers, updated encryption algorithms, hardware-embedded secret keys, etc.

The routing information includes status of routes between edge computing devices, physical links between edge computing devices, etc. The addressing information includes identifiers of data source devices, identifiers of site computing devices and edge computing devices, and identifiers of sites, etc.

The protocol information includes desired protocol(s) for an application supported by the user computing devices 18-1 and 18-2, data protocol identifiers associated with messages that traverse the edge node network 12 carrying data and more, and data protocols supported by the data source devices, etc. The presence information includes real-time status of computing devices of the proprietary network 10 and historical status information of the computing devices.

The analytics information includes summaries of use of the proprietary network 10 and portions of the data. The summaries include a list of data types of the data being communicated on the proprietary network 10, historical patterns of the data type communication, and historical usage patterns of the proprietary network 10 to communicate data on behalf of each data source device, etc. The portions of the data include random samples of data, targeted samples of the data, and data associated with a particular historical pattern.

FIG. 2 is a schematic block diagram of various computing devices of the proprietary network 10 of FIG. 1. In an embodiment, the edge computing devices 14, the site computing devices 28, the user computing devices 18, and the end user computing devices 20 include a computing core 52, one or more visual output devices 74 (e.g., video graphics display, touchscreen, LED, etc.), one or more user input devices 76 (e.g., keypad, keyboard, touchscreen, voice to text, a push button, a microphone, etc.), one or more audio output devices 78 (e.g., speaker(s), headphone jack, a motor, etc.), and one or more visual input devices 80 (e.g., camera, photocell, etc.).

The computing devices further include one or more universal serial bus (USB) devices (USB devices 1-U), one or more peripheral devices (e.g., peripheral devices 1-P), and one or more memory devices (e.g., one or more flash memory devices 92, one or more hard drive (HD) memories 94, one or more solid state (SS) memory devices 96, and/or cloud memory 98). The computing devices further include one or more wireless location modems 84 (e.g., global positioning satellite (GPS), Wi-Fi, angle of arrival, time difference of arrival, signal strength, dedicated wireless location, etc.), and one or more wireless communication modems 86-1 through 86-N (e.g., a cellular network transceiver, a wireless data network transceiver, a Wi-Fi transceiver, a Bluetooth transceiver, a 315 MHz transceiver, a zig bee transceiver, a 60 GHz transceiver, etc.).

The computing devices further include a telco interface 102 (e.g., to interface to a public switched telephone network), a wired local area network (LAN) 88 (e.g., optical, electrical), a wired wide area network (WAN) 90 (e.g., optical, electrical), and a communication modem 87 (e.g., facilitating wireless and/or wireline communications of data)

The computing core 52 includes a video graphics module 54, one or more processing modules 50-1 through 50-N, a secure processing module 51 (e.g., storing keys and executing encryption algorithms), a memory controller 56, one or more main memories 58-1 through 58-N (e.g., RAM as local memory), and one or more input/output (I/O) device interface modules 62. The computing core 52 further includes an input/output (I/O) controller 60, a peripheral interface 64, one or more USB interface modules 66, one or more network interface modules 72, one or more memory interface modules 70, and/or one or more peripheral device interface modules 68.

Each of the interface modules 62, 66, 68, 70, and 72 includes a combination of hardware (e.g., connectors, wiring, etc.) and operational instructions stored on memory (e.g., driver software) that are executed by one or more of the processing modules 50-1 through 50-N and/or a processing circuit within the interface module. Each of the interface modules couples to one or more components of the computing devices. For example, one of the IO device interface modules 62 couples to an audio output device 78. As another example, one of the memory interface modules 70 couples to flash memory 92 and another one of the memory interface modules 70 couples to cloud memory 98 (e.g., an on-line storage system and/or on-line backup system).

In other embodiments, the computing devices may include more or less devices and modules than shown in this example embodiment. The secure processing module 51 (e.g., a Trusted Platform Module (TPM)) includes a hardware module for securely generating and storing security parameters (e.g., encryption keys) when required for secure attestation and authenticated access to the edge node network 12 and cannot be tampered with by application software.

Figure 3:
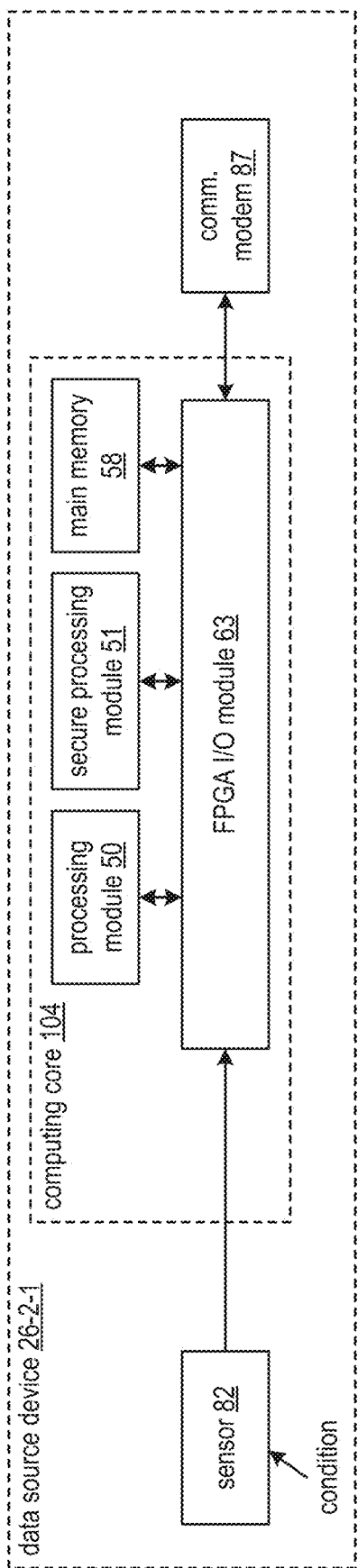
FIGS. 3 and 4 are schematic block diagrams of embodiments of a data source device of a proprietary network in accordance with the present invention.
Figure 4:
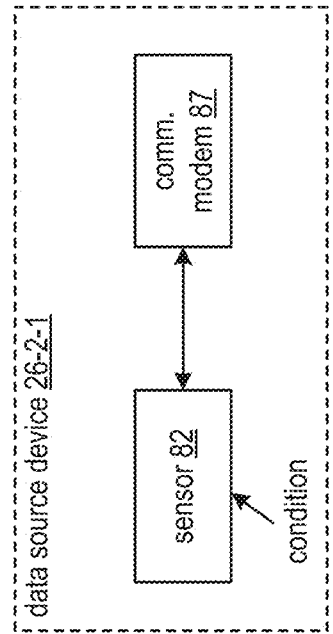

FIGS. 3 and 4 are schematic block diagrams of embodiments of a data source device of a proprietary network. FIG. 3 is a schematic block diagram of an embodiment of the data source device 26-2-1 of FIG. 1. The data source device 26 includes a sensor 82, a computing core 104, and the communication modem 87 of FIG. 2. The computing core 104 includes at least one processing module 50 of the processing modules 50-1 through 50-N of FIG. 2, the secure processing module 51 of FIG. 2, at least one main memory 58 of the main memories 58-1 through 58-N of FIG. 2, and one or more Field Programmable Gate Array (FPGA) input/output (I/O) modules 63. In other embodiments, the device may include more or less devices and modules than shown in this example embodiment. For example, two or more sensors 82. In other embodiments, the data source device 26 includes more or less devices and modules than shown in this example embodiment. For instance, the computing core 104 only includes the FPGA I/O module 63.

The sensor 82 interprets the condition to provide sensor data to the computing core 104. The computing core 104 generates data based on the sensor data of the condition and sends, via the communication modem 87, the data to an associated site computing device or other device. For instance, the processing module 50 controls the FPGA I/O module 63 to route the sensor data to the main memory 58 for temporary storage. The processing module 50 subsequently routes, via the FPGA I/O module 63, the temporarily stored sensor data from the main memory 58 to the secure processing module 51 for encryption to produce encrypted data. The encryption is performed utilizing a selected encryption algorithm and encryption key stored within the secure processing module 51.

Having facilitated encryption of the data, the processing module 50 further facilitates routing, via the FPGA I/O module 63, of the encrypted data from the secure processing module 51 to the communication modem 87 for transmission to the associated site computing device. Alternatively, the processing module 50 further facilitates routing, via the FPGA I/O module 63, the encrypted data from the secure processing module 51 to the main memory 58 for temporary storage until the communication modem 87 is ready to transmit the encrypted data.

FIG. 4 illustrates another embodiment of the data source device 26-2-1 of FIG. 3. The data source device 26-2-1 includes the sensor 82 of FIG. 3 and the communication modem 87 of FIG. 2. In an example of operation, the sensor 82 interprets the condition to produce the sensor data and sends the sensor data to the communication modem 87 for transmission to the associated site controller device, or other device, as one or more data messages.

FIGS. 5A, 5B, 5C, and 5D are schematic block diagrams of embodiments of a proprietary network illustrating methods to communicate data messages. The proprietary network 10 includes data source devices 26-2-1 and 26-2-2 of FIG. 1, a plurality of computing entities 200-1 through 200-4, user computing devices 18-1 through 18-2 of FIG. 1, the edge node network 12 of FIG. 1, and the core network 24 FIG. 1. In an embodiment, the computing entity 200-2 includes the site computing device 28-2 of FIG. 1 and the edge computing device 14-2 of FIG. 1. In an embodiment, computing entities 200-1, 200-3, and 200-4 include, respectively, edge computing device 14-1, edge computing device 14-3, and edge computing device 14-4 of FIG. 1. In yet another embodiment, the computing entity 200-2 further includes the data source devices 26-2-1 and 26-2-2.

Figure 5A:
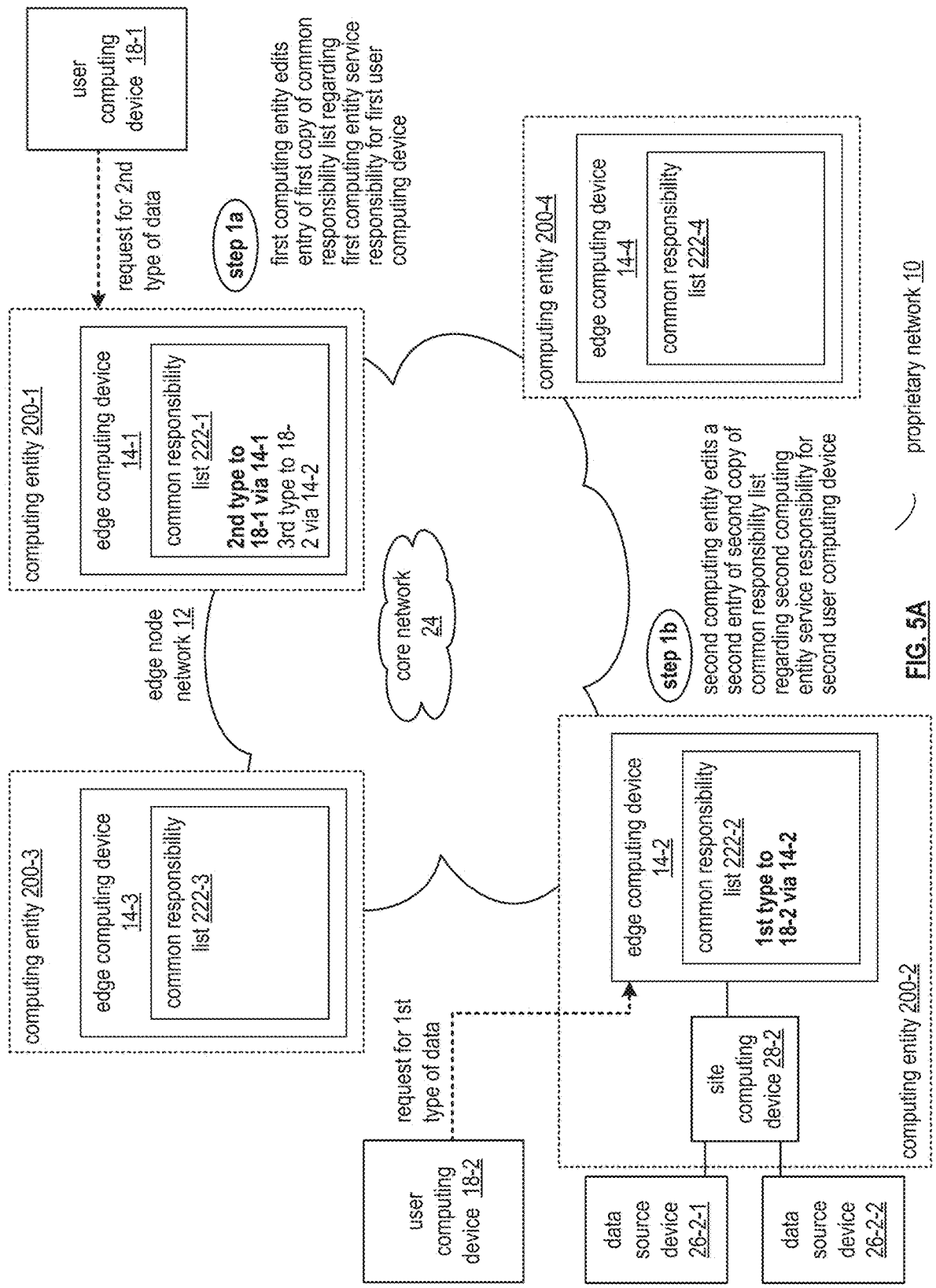

FIG. 5A illustrates an example of the communicating of the data messages where computing entity 200-1 edits an entry in a first copy of a common responsibility list 222-1 of the proprietary network 10. The common responsibility list 222-1 includes a plurality of entries. The entry includes information regarding the first computing entity's service responsibility for the first user computing device 18-1. For example, the information indicates that the computing device 200-1 is responsible for servicing data needs requested by the user computing device 18-1. For instance, the entry indicates that a second type of data is to be sent to user computing device 18-1 via the edge computing device 14-1 (e.g., data sourced by at least one of the data source devices 26-2-1 and 26-2-2).

Another entry in the common responsibility list 222-1 includes information regarding another computing entity's service responsibility for another user computing device. For instance, a third type of data is to be delivered to user computing device 18-2 via the edge computing device 14-2.

The editing of the entry in the first copy of the common responsibility list 222-1 includes interpreting a subscription request and updating the entry to produce an updated entry. The subscription request includes instructions from the user computing device 18-1 indicating one of adding to the entry, deleting from the entry, or modifying the entry.

The interpreting of the subscription request includes interpreting the subscription request from the first user computing device 18-1 to produce a subscription interpretation. The subscription of request includes the information regarding the first computing entity's service responsibility for the first user computing device. For example, the computing entity 200-1 interprets a received request for the second type of data from the user computing device 18-1 as adding an entry associated with forwarding the second type of data to the user computing device 18-1 via the edge computing device 14-1.

The updating of the entry to produce the updated entry includes adding the entry when the subscription interpretation indicates adding a new data subscription. For example, the computing entity 200-1 produces the updated entry to indicate to forward data of the second data type to the user computing device 18-1 via the edge computing device 14-2. The updating includes deleting the entry when the subscription interpretation indicates deleting an existing data subscription. The updating further includes modifying the entry when the subscription interpretation indicates modifying the existing data subscription (e.g., add a data type and delete another data type).

In a similar way, the computing entity 200-2 updates a second entry of a second copy of the common responsibility list 222-2 regarding a service responsibility of the second computing entity 200-2 for a second user computing device 18-2 based on a request from the user computing device 18-2. For example, the computing entity 200-2 produces the second edited entry of the second copy of the common responsibility list 222-2 to indicate that a first type of data is to be forwarded to the user computing device 18-2 via the edge computing device 14-2.

Figure 5B:
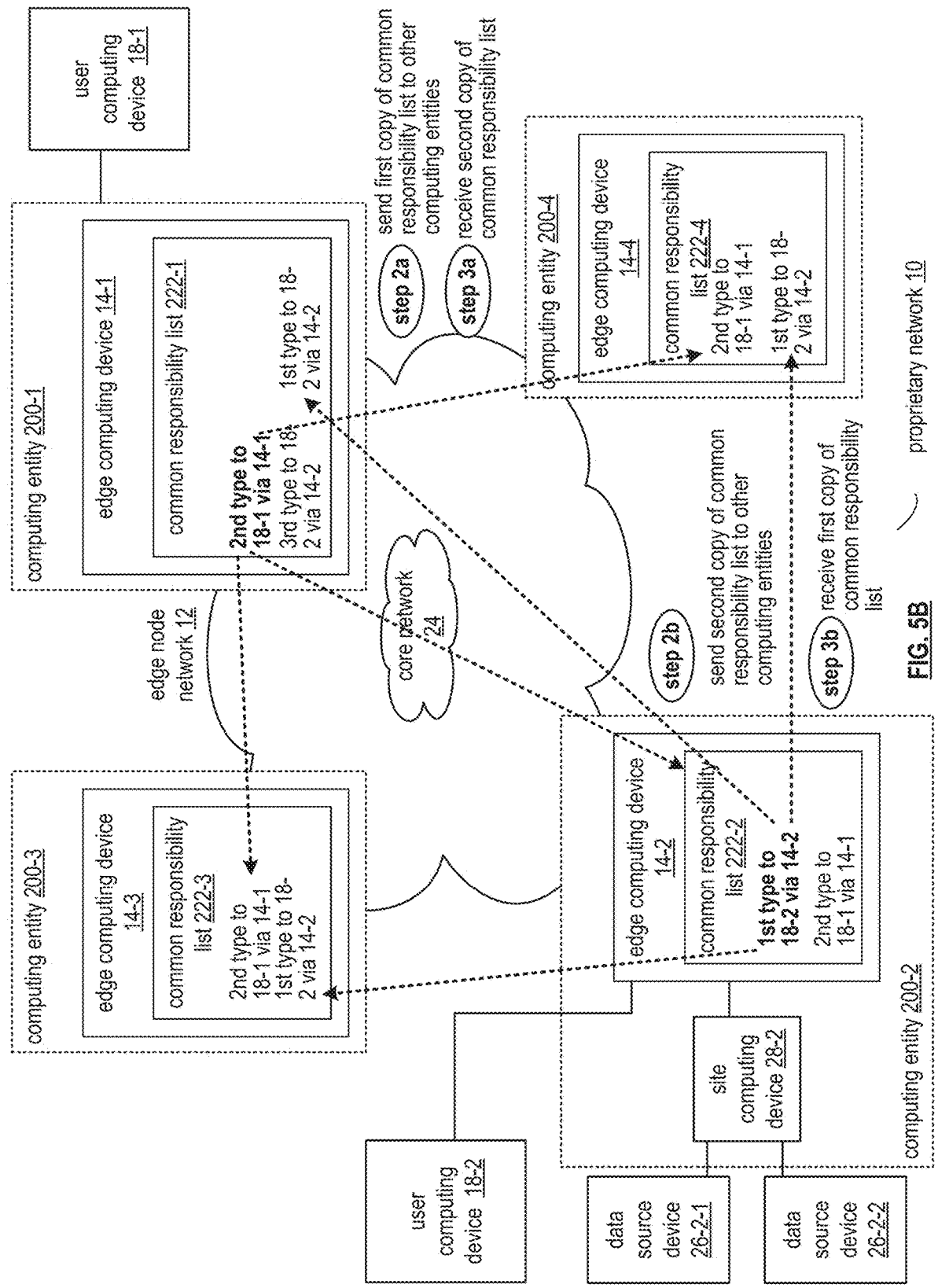

FIG. 5B further illustrates the example of the communicating of the data messages where the computing entity 200-1 sends at least the edited entry to other computing entities of the proprietary network 10. For example, the computing entity 200-1 sends, via the core network 24 and the edge node network 12, the first copy of the common responsibility list 222-1 to each of the computing entities 200-2, 200-3, and 200-4. Alternatively, the computing entity 200-1 sends just the edited entry (e.g., indicating to forward the second type of data to the user computing device 18-1 via the edge computing device 14-1).

In a similar fashion, the computing entity 200-2 sends at least the second edited entry to other computing entities. For example, the computing entity 200-2 sends, via the core network 24 and edge node network 12, the second copy of the common responsibility list 222-2 to computing entities 200-1, 200-3, and 200-4. Alternatively, the computing entity 200-2 sends just the second edited entry (indicating to forward the first type of data to the user computing device 18-2 via the edge computing device 14-2).

The computing entity 200-1 receives the at least the second edited entry from the second computing entity. For example, the computing entity 200-1 receives the second edited entry from the computing entity 200-2.

In a similar fashion, the computing entity 200-2 receives the at least the edited entry from the first computing entity. For example, the computing entity 200-2 receives the edited entry from the computing entity 200-1.

Figure 5C:
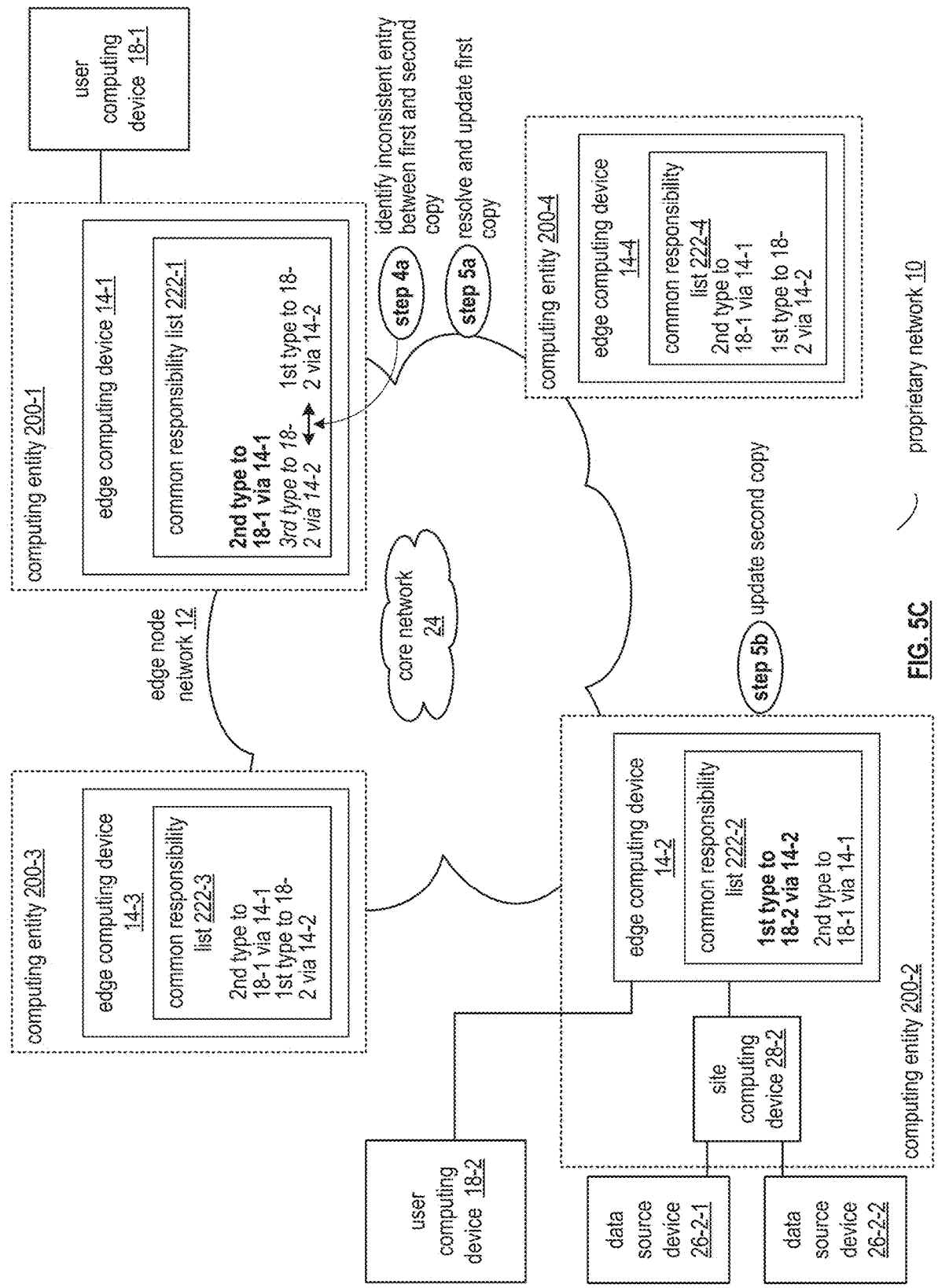

FIG. 5C further illustrates the example of the communicating of the data messages where the computing entity 200-1 updates the first copy of the common responsibility list 222-1 with the at least the second edited entry. The updating includes a series of steps. A first step includes receiving the second copy of the common responsibility list 222-2, where the second copy includes the at least the second edited entry (e.g., first type of data to be forwarded to user computing device 18-2 via the edge computing device 14-2).

A second step includes comparing the first copy of the common responsibility list 222-1 to the second copy of the common responsibility list 222-2. A third step includes identifying an inconsistent entry between the first copy of the common responsibility list 222-1 and the second copy of the common responsibility list 222-2. For example, the entry that indicates to forward the third type of data to the user computing device 18-2 is inconsistent with the entry that indicates to forward the first type of data to the user computing device 18-2. Other approaches to detect the inconsistent entry includes indicating the inconsistency when a data type is received from the data source device and the common responsibility list does not indicate a recipient and assuming the inconsistency when a consistency timeframe has expired (e.g., time since last list update).

Having identified the inconsistent entry, a fourth step includes the computing entity 200-1 resolving the inconsistent entry by one of a variety of approaches. A first approach includes utilizing the inconsistent entry of the first copy of the common responsibility list 222-1 over the inconsistent entry of the second copy of the common responsibility list 222-2. In this example, this approach is not appropriate since the inconsistent entry of the second copy more clearly represents the data requested by the user computing device 18-2.

The first approach is utilized when an entry timestamp of the inconsistent entry of the first copy of the common responsibility list compares favorably (i.e. newer) to an entry timestamp of the inconsistent entry of the second copy of the common responsibility list. The first approach is also utilized when the inconsistent entry of the first copy of the common responsibility list includes information regarding the first computing entity's service responsibility for the first user computing device (i.e., entry from the responsible computing entity).

A second approach to resolve the inconsistent entry includes utilizing the inconsistent entry of the second copy of the common responsibility list 222-2 over the inconsistent entry of the first copy of the common responsibility list 222-1. In this example, this approach is appropriate since the inconsistent entry of the second copy more clearly represents the data requested by the user computing device 18-2.

A third approach to resolve the inconsistent entry includes utilizing a common entry of a majority of the first copy of the common responsibility list 222-1, the second copy of the common responsibility list 222-2, and a third copy of the common responsibility list (e.g., common responsibility list 222-4 etc.). For example, the computing entity 200-1 issues a request for further copies of the common responsibility list from other computing entities and resolves the inconsistency based on what a majority of the common responsibility lists indicate with regards to the inconsistent entry. For instance, the majority indicate that the first type of data, not the third type of data, is to be forwarded to the user computing device 18-2 via the edge computing device 14-2.

A fourth approach to resolve the inconsistent entry includes utilizing a source entry that includes information regarding a source computing entity's service responsibility for a corresponding user computing device associated with the inconsistent entry. For example, the computing entity 200-1 identifies the source computing entity as the computing entity 200-2, issues an entry clarification request with regards to the inconsistent entry to the computing entity 200-2, and resolves the inconsistent entry based on a response received from the computing entity 200-2 (e.g., the first type of data is to be forwarded to the user computing device 18-2 via the edge computing device 14-2). Having resolves the inconsistent entry, the computing entity 200-1 updates the common responsibility list 222-1.

In a similar fashion, the computing entity 200-2 updates the second copy of the common responsibility list 222-2 with the at least the edited entry (e.g., indicating that the second type of data is to be forwarded (e.g., when not inconsistent) to the user computing device 18-1 via the edge computing device 14-1. The updating of the second copy of the common responsibility list 222-2 includes a series of steps. A first step includes the computing entity 200-2 receiving the first copy of the common responsibility list 222-1.

A second step includes the computing entity 200-2 comparing the first copy of the common responsibility list 222-1 to the second copy of the common responsibility list 222-2. A third step includes the computing entity 200-2 identifying an inconsistent entry between the first copy of the common responsibility list 222-1 and the second copy of the common responsibility list 222-2.

When identifying the inconsistent entry, the computing entity 200-2 resolves the inconsistent entry by one of a variety of approaches. A first approach includes utilizing the inconsistent entry of the first copy of the common responsibility list 222-1 over the inconsistent entry of the second copy of the common responsibility list 222-2.

A second approach includes utilizing the inconsistent entry of the second copy of the common responsibility list 222-2 over the inconsistent entry of the first copy of the common responsibility list 222-1. A third approach includes utilizing a common entry of a majority of the first copy of the common responsibility list, the second copy of the common responsibility list, and a third copy of the common responsibility list. A fourth approach includes utilizing a source entry that includes information regarding a source computing entity's service responsibility for a corresponding user computing device associated with the inconsistent entry.

Figure 5D:
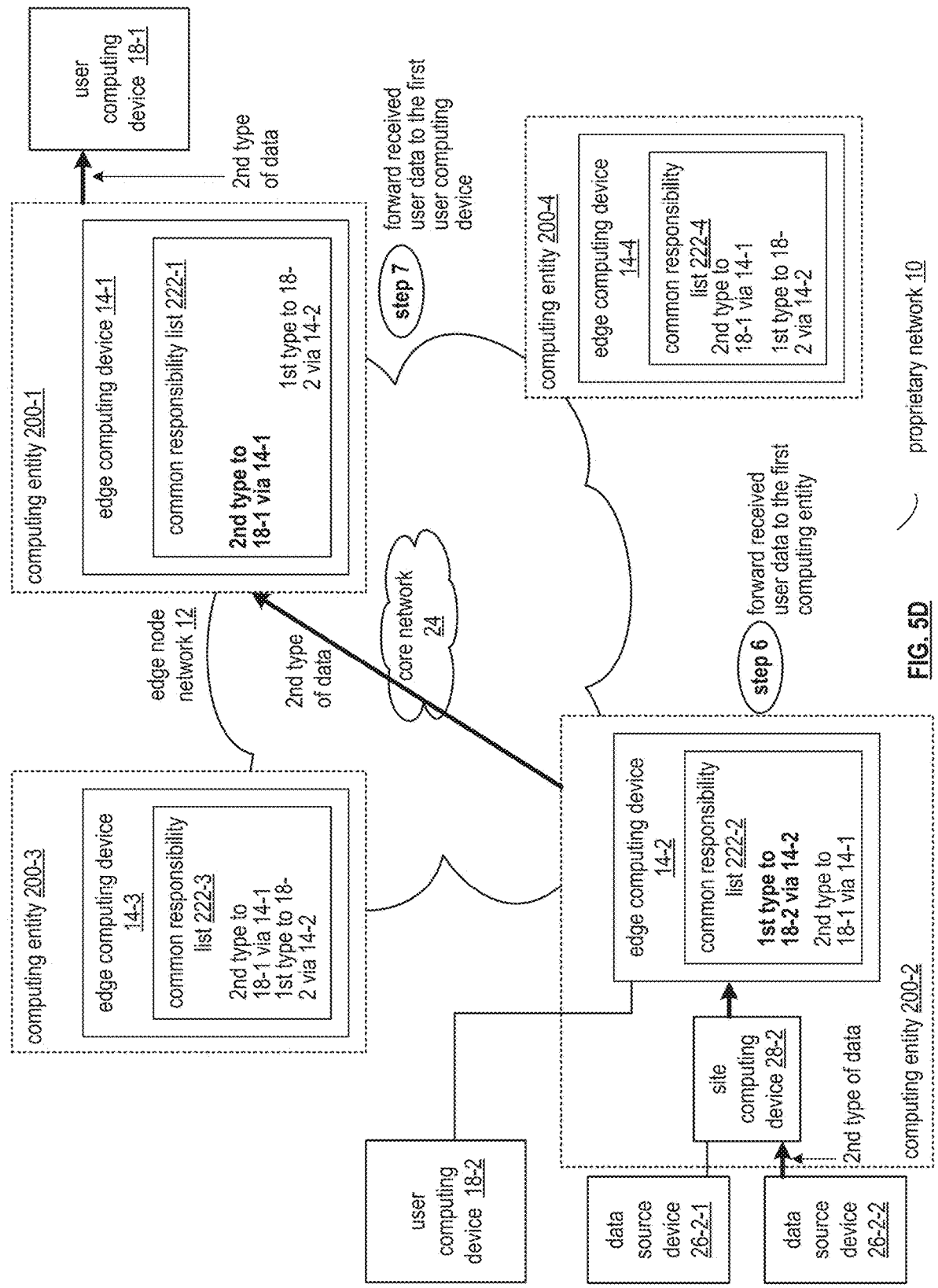

FIG. 5D further illustrates the example of the communicating of the data messages where the computing entity 200-2 receives user data from data source device 26-2-2. For example, the site computing device 28-2 receives data of the second type of data from the data source device 26-2-2 and forwards the second type of data to the edge computing device 14-2.

The computing entity 200-2 forwards, via the edge node network 12 and the core network 24, the user data to the first computing entity 200-1 when the edited entry indicates that the first computing entity's service responsibility includes forwarding the user data the first user computing device. For example, the edge computing device 14-2 interprets the common responsibility list 222-2 to extract the entry associated with sending the second type of data to the user computing device 18-1 via the edge computing device 14-1 and sends, via the edge node network 12 and the core network 24, the second type of data to the edge computing device 14-1. Alternatively, or in addition to, the computing entity 200-2 replicates the user data to send the replicated data to more than one other computing entity when the second copy of the common responsibility list indicates that two or more user computing devices are associated with two or more computing entities, where the two or more user computing devices are to receive the user data.

The computing entity 200-1 receives the user data from the computing entity 200-2. For example, the edge computing device 14-1 receives, via the edge node network 12 and the core network 24, the second type of data from the edge computing device 14-2.

Having received the user data, the computing entity 200-1 forwards the user data to the first user computing device 18-1 when the edited entry indicates that the first computing entity's service responsibility includes forwarding the user data to the first user computing device 18-1. For example, the edge computing device 14-1 interprets the common responsibility list 222-1 to extract the entry associated with sending the second type of data to the user computing device 18-1 and sends the second type of data to the user computing device 18-1.

The examples described above in conjunction with one or more processing modules of one or more computing devices can alternatively be performed by other modules of the proprietary network 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, a seventh memory element, etc.) that stores operational instructions can, when executed by the one or more processing modules of the one or more computing devices of the proprietary network 10, cause the one or more computing devices to perform any or all of the examples described above.

FIG. 6 is a schematic block diagram of another embodiment of a secure data network that includes a data source device 26, a site computing device 28, a plurality of edge computing devices 14-1 through 14-7, master edge computing devices 15-1 and 15-2, at least two user computing devices 18-1 and 18-2, and at least two end user computing devices 20-1 and 20-2. The data source includes data source device 26 may include one or more of the devices and the modules of the data source device 26-2-1 of FIG. 3. For example, the data source device 26 includes the sensor 82 and the processing module 50 of FIG. 3.

The processing module 50 of the data source device 26 includes an edge node network utilization module 110. The site computing device 28 includes the processing module 50 of FIG. 2. The processing module 50 includes an access module 112, a routing module 116, a security module 122, and an analytics module 114.

Each edge computing device of the plurality of edge computing devices 14-1 through 14-7 includes one or more of the devices and the modules of the computing devices of FIG. 2. For example, each edge computing device includes the processing module 50 of FIG. 2. The processing module 50 includes the access module 112, the analytics module 114, the routing module 116, an identity module 118, a presence module 120, the security module 122, and a data transformation module 124.

The edge node network utilization module 110 includes one or more of the functions associated with the edge computing devices 14-1 through 14-7. For instance, the edge node network utilization module 110 includes the access module 112, the identity module 118, and the security module 122. Each of the master edge computing devices 15-1 and 15-2 further operate to distribute any operational information required for the secure data network. For instance, information to establish routes and establish security credentials that is not readily available by the edge computing devices (e.g., a master routing table maintained by the master edge computing devices).

Generally, the modules 112-124 within the processing modules 50 of the data source device 26, the site computing device 28, and the edge computing devices 14-1 through 14-7 process (e.g., generate, store, utilize for decision-making, transfer) synchronization parameters within synchronization messages 38 to maintain operation of the secure data network. For example, functionality of the access module 112 includes causing the processing module 50 to utilize one or more of protocol information and configuration information to provide physical access to other nodes and/or devices.

Functionality of the analytics module 114 includes causing the processing module 50 to utilize the analytics information to optimize generation and transmission of data messages and transformed data messages. Functionality of the routing module 116 includes causing the processing module 50 to utilize the routing information to optimize transmission of information through the edge computing devices.

Further examples of the processing include functionality of the identity module 118, which includes causing the processing module 50 to utilize the addressing information to identify which sensors are associated with which data source devices and which data source devices are to access which user computing devices. Functionality of the presence module 120 includes causing the processing module 50 to utilize the presence information to optimize utilization of various edge nodes to optimize data traffic routes between the data source device and a corresponding user computing device. Functionality of the security module 122 includes causing the processing module 50 to utilize security information to authenticate a desirable and valid connection between edge computing devices and data source devices and to protect confidential information exchange between the edge computing devices and data source devices.

Functionality of the data transformation module 124 includes causing the processing module 50 to utilize the protocol information to convert portions of the data messages into the transformed data messages to support multiple desirable attributes of the secure data network. The desired attributes include a favorable security level, a favorable efficiency level, a favorable data latency level, and a favorable compatibility level with numerous data protocols associated with data applications of the user computing devices.

In an example of operation of the secure data network, the edge computing devices 14-1 through 14-7, the site computing device 28, and the data source device 26 exchange synchronization messages 38 from time to time to develop and convey the synchronization parameters. For example, at least some the edge computing devices 14-1 through 14-7 convey, by exchanging with each other, at least some of the synchronization parameters to include one or more of the configuration information, the analytics information, the protocol information, the addressing information, the security information, the routing information, and the presence information. For instance, edge computing device 14-1 receives one or more of the synchronization patterns from the user computing device 18-1 for local storage within a memory of the edge computing device 14-1.

A trusted edge computing device control application of the user computing device 18-1 is affiliated with the plurality of edge computing devices 14-1 through 14-7. In another instance, edge computing device 14-1 generates a synchronization message 38 to include substantially all of the synchronization parameters and transmits the synchronization message 38 to the edge computing device 14-6 to update the synchronization parameters stored locally within a memory of the edge computing device 14-6.

As another example of the developing and conveying of the synchronization parameters, at least some of the edge computing devices 14-1 through 14-7, the site computing device 28, and the data source device 26 develop, by generating with each other (e.g., determining, modifying, updating, correcting, etc.), at least some of the synchronization parameters to include one or more of the configuration information, the analytics information, the protocol information, the addressing information, the security information, the routing information, and the presence information. For instance, the site computing device 28 exchanges limited security information (e.g., to lead to generation of a common secret encryption key) with the data source device 26 to further develop trusted security between the site computing device 28 and the data source device 26.

In another instance, the site computing device 28 receives configuration information from the data source device 26. The configuration information includes addressing information associated with the sensor 82. The site computing device 28 further receives companion configuration information from a data application associated with the user computing device 18-1 to match the sensor with the data application to generate further updated configuration information. In yet another instance, the edge computing device 14-7 monitors data messages received from the site computing device 28 to generate updated analytics information based on data attributes of data within the data messages (e.g., data types, data sizes, etc.).

Having developed and conveyed a sufficient number and sufficient level of the synchronization parameters to support ongoing operations, the secure data network facilitates communication of data from the sensor 82 to one or more corresponding data applications of the user computing devices 18-1 and 18-2. In an example of operation of the communication of the data, having established trust and security information between the data source device 26 and the site computing device 28, the site computing device 28 receives data messages 34-1 from the data source device 26. The edge node network utilization module 110 encodes data from the sensor 82 in accordance with a sensor data protocol to produce the data messages 34-1. The encoding of the data includes utilizing at least one of an industry standard sensor data protocol and a proprietary data protocol. The industry standard sensor data protocols include one or more of Message queue telemetry transport (MQQT), constrained application protocol (CoAP), and data distribution service (DDS).

Having received the data messages 34-1, the site computing device 28 identifies active data applications associated with the user computing devices 18-1 and 18-2 that are affiliated with the data source device 26 and/or the sensor 82 based on one or more of the addressing information and the configuration information. Having identified the active data applications, the site computing device 28 determines at least a portion of a route for transferring data associated with the data messages 34-1 to the user computing devices 18-1 and 18-2 based on one or more of the routing information and the presence information. Having determined the routing information, the site computing device 28 sends the data messages 34-1 to the edge computing device 14-7 in accordance with the routing information.

Having received the data messages 34-1, the edge computing device 14-7 determines whether to convert the data messages into transformed data messages based on one or more of the configuration information, the analytics information, the addressing information, and the protocol information. For instance, the edge computing device 14-7 determines to convert the data messages 34-1 from the sensor data protocol into first and second data message protocols when the protocol information indicates that the first and second data protocol messages are associated with the affiliated data applications of the user computing devices 18-1 and 18-2.

In another instance, the edge computing device 14-7 determines to convert the data messages 34-1 from the sensor data protocol into a third data message protocol. The determining includes selecting the third data message protocol when the analytics information indicates that data optimization (e.g., providing important data on a more timely basis, estimating missing data based on historical data, summarizing multiple data points, etc.) based on the an interpretation of a data attribute (e.g., actual data, frequency of data transmission, a data type, etc.) of the data messages 34-1 is associated with the third data message protocol and the configuration information indicates that user computing devices 18-1 and 18-2 are compatible with the third data message protocol.

Having determined to convert the data messages 34-1, the edge computing device 14-7 generates transformed data messages 36-1 and transformed data messages 36-2 from the data messages 34-1 based on attributes of the first and second data message protocols of the protocol information. Having generated the transformed data messages, the edge node 14-7 obtains the route for transferring the transformed data messages to the corresponding cloud services. The obtaining may include retrieving route information and updating the retrieve route information based on one or more of updated presence information, updated security information, and updated routing information.

In an instance of obtaining the route, the edge computing device 14-7 determines an updated route to include sending the transformed data messages to the edge computing device 14-3 when the updated presence information and updated routing information are favorable with regards to utilizing the edge computing device 14-3 and sending the transformed data messages 36-1 and 36-2 to the edge computing device 14-3. Alternatively, the edge computing device 14-7 transmits the transformed data messages 36-1 and 36-2 directly to the user computing devices 18-1 and 18-2 via the core network 24 of FIG. 1 when attributes of the routing information are favorable for that route.

Having received the transformed data messages 36-1, the edge computing device 14-1 facilitates forwarding of the transformed data messages 36-1 to the user computing device 18-1 for utilization by the corresponding data application affiliated with the data source device 26 and/or the sensor 82. Having received the transformed data messages 36-2, the edge computing device 14-2 facilitates forwarding of the transformed data messages 36-2 to the user computing device 18-2 for utilization by the corresponding data application affiliated with the data source device 26 and/or the sensor 82.

Having processed the transformed data messages 36-1, the user computing device 18-1 exchanges corresponding application messages 40-1 with the end user computing device 20-1. Having processed the transformed data messages 36-2, the user computing device 18-2 exchanges corresponding application messages 40-2 with the end user computing device 20-2.

FIG. 7A is a schematic block diagram of another embodiment of the communication system 10 of FIG. 1. Generally, an embodiment of this invention presents solutions where the communication system supports a multidimensional real-time context analysis via stream extraction.

The communication system includes data source devices 26-1 through 26-N of FIG. 3, the user computing devices 18-1 through 18-N of FIG. 1, and the edge node network 12 of FIG. 1. Each data source device 26-1 through 26-N may include one or more of the devices and the modules of the data source device 26 of FIG. 6. For example, the data source devices 26-1 through 26-N include sensor 82 of FIG. 3 and the processing module 50 of FIG. 3, where the processing module 50 includes the edge node network utilization module 110 of FIG. 6.

The edge node network 12 supports optimizing and enabling user computing devices 18-1 through 18-N to interact with and receive data collected by sensors on data source devices 26-1 through 26-N. The edge node network 12 includes edge computing devices 14-1 through 14-N, where the edge computing devices 14-1 through 14-N include one or more of the devices and modules of the edge computing devices 14-1 through 14-N of FIG. 2. For example, the edge computing devices 14-1 through 14-N includes the processing module 50 of FIG. 2. The processing module 50 of the edge computing devices 14-1 through 14-N includes the access module 112 of FIG. 6, the analytics module 114 of FIG. 6, and the routing module 116 of FIG. 6.

The routing module 116 supports dynamic and advanced routing of data messages across the edge node network 12. The access module 112 includes message content/timing service 501 which functions to provide accurate content and timing information related to streams of received data messages and which will be utilized by analytics module 114. The analytics module 114 includes performance analysis module 504 and mitigation module 508.

The context/performance analysis module 504 includes storage for configured/expected data module 505 and instantaneous data module 506 and also a prediction/assessment module 507, which together function to analyze the content and timing information provided by access module 112 against expected and historical data in order to assess multidimensional real-time context and performance of both data devices (e.g., data source device) and the edge node network. The optimization/mitigation module 508 processes these analytical assessments and determines corrective actions to mitigate issues or optimization actions that will improve communication system performance in real-time.

In an example of the operation of the communication system, as data source device 26-1 transmits a stream of discrete data messages through the edge node network 12 and the stream of data messages are received by edge computing device 14-1. The edge computing device 14-1 supports the routing of the data messages to their respective destination user computing device 18-1.

When receiving each one of these discrete data messages 34-1, the message content/timing service 501 extracts message type and content information, including message types such as sensor reading updates, and device functional status updates. The message content/timing service 501 also precisely measures critical timing parameters for each message type, including inter-message timing since the last message of this type, and restarts a last-message-received timer that will run until the next message of this type is received.

The message/content timing service 501 also inspects message sequence numbers in order to maintain a lost message count whenever a consecutive sequence number is missing. The message/content timing service 501 continuously repeats these functions independently for streams of data messages from all data devices routing through edge node 14-1, including data message 34-2 stream and data message 34-3 stream from data source devices 26-2 and 26-3, respectively. At a programmable interval that preserves the real-time nature of these measurements, the message content/timing service 501 sends these measurements in extracted message parameters 502-1 through 502-3 to instantaneous data module 506 within performance analysis module 504 of analytics module 114, where the measurements are stored for analysis.

Having received the extracted parameter measurements, the instantaneous data module 506 calculates instantaneous context of the data device or edge network by examining the content of the various message types, such as sensor readings (temperature, pressure, etc.) and device status (transactions per second, chip temperature, battery level, etc.) to establish the context in which the data device is currently operating. The instantaneous data module 506 calculates instantaneous performance of the data device or edge network by examining the timing data for each message type and calculating the frequency of sensor reading update messages (utilizing the inter-message timing data), the lost message frequency, and also the standard deviation and related statistical measurements of the measured data.

The configured/expected data module 505 of the context/performance analysis module 504 gathers configuration and expected performance data from data devices in order to establish a baseline for optimal context and performance expectations for each data device and for the edge node network. In this example, data source device 26-1 submits its expected context and performance behavior within the device config parameters 500 message to the configured/expected data module 505 at the time of deployment and also at any reconfiguration events. Alternatively, when data devices do not provide their configured context and performance expectation data, the context/performance analysis module 504 will use a predictive model as discussed below to establish the baseline for expected performance.

The prediction/assessment module 507 utilizes data from both the instantaneous data module 506 and the configured/expected data module 505 in order to make assessments of the current context and performance of the data devices and the edge network. The prediction/assessment module 507 also generates a prediction model that can estimate future context and performance.

The prediction model may be based on regression methods (linear, logistic, robust, semiparametric), neural networks, or other machine learning methods. The prediction/assessment module 507 compares both instantaneous data with expected data, and estimated data with expected data to determine if context or performance has exceeded, or is estimated to exceed acceptable tolerances. Examples of context assessments include identifying unusual trends or outliers in sensor readings or other message content, or estimating loss of battery life in a sensor. Examples of performance assessments include identifying potential failures of the network path or data device if the last message received timer in the instantaneous data substantially exceeds the expected message reception interval, and identifying a network path specific issue when message lost count exceeds the expected message loss rate. Having made a context or performance assessment, the context/performance analysis module 504 sends these assessments to optimization/mitigation module 508.

Having received an assessment from the context/performance analysis module 504, the optimization/mitigation module 508 determines whether any corrective or optimization actions are required, and then initiates at least one or more of three types of actions, including data device actions, cloud service actions, and routing actions. Data device actions include requesting a hard or soft reset of the data device, requesting reconfiguration of the data device, and requesting the data device to perform self-tests. For example, where the edge node 14-1 is the serving edge node with direct or initial connectivity with a data device, and the assessment identifies that the data device may be operating improperly, such as when the standard deviation of the inter-message timing between messages (message frequency) of sensor readings or status updates has exceeded expected tolerances, a possible corrective action would be to request a reset of the device utilizing device action 511.

When a cloud service (e.g., a user computing device) retains complete control of the data devices to which the cloud service is associated, then the data device reset, reconfiguration and self-test actions must be requested of the cloud service utilizing cloud service action 510, and then initiated by the cloud service. Routing actions include changes to the edge computing device 14-1 routing of the data message stream in order to optimize/reduce packet/message latency and jitter. For example, when edge computing device 14-1 is not a serving edge node of data source device 26-N, but just another routing hop on the path of the stream of data message 34-N, and the assessment for this stream indicates that the latency and jitter of the data messages are estimated to exceed expected performance tolerances, then optimization/mitigation module 508 can utilize a routing action 509 command to optimize the route to the destination cloud service 18-N. Having received the optimize route command, routing module 116 switches from route A, which was the prior route that included edge computing device 14-2, to route B for the stream of the data message 34-N, thus shortening the route by one hop and reducing the estimated end to end latency.

FIG. 7B is a logic diagram of an embodiment of a method for providing multidimensional real-time context analysis utilizing stream extraction in an edge node network. In particular, a method is presented for use in conjunction with one or more functions and features described in conjunction with FIGS. 1-4, 6, 7A, and FIG. 7B. The method includes step 1020, where an edge node of a plurality of edge nodes that cooperatively transport data messages from a data device to one or more cloud services, obtains a set of performance parameters for each timeframe of a plurality of time frames associated with a sequence of data messages sourced by the data device. The performance parameters include, for each message type of one or more message types, at least one of inter-message timing, time since last message, and loss message count.

Obtaining a set of performance parameters includes measuring precise timing of a sequence of associated received data messages at the ingress access module of an edge node, and forwarding the timing information to an analytics module at adjustable update timeframes. Measuring precise timing includes extracting the source IP address of the data messages to associate each with a separate data device and extracting the message type and content information such that the timing can be specific to each data device and message type within the stream. Measuring may also include utilization of timers that measure the time between messages of the same device and type, and resetting the timer upon reception of the last of this type of received message such that a time since last message value can be captured independently for each data device and message type in the stream. Measuring loss message count includes extracting sequence numbers from the messages of the same device and type, identifying when one or more expected sequence numbers have been skipped in the last received message, and retaining a count for the missed sequence numbers corresponding to missed or lost messages in the stream.

The method continues at step 1022, where the edge node, for each timeframe, analyzes the set of performance parameters to produce an instantaneous performance level, where the instantaneous performance level includes at least one of an average message reception frequency, an inter-message timing standard deviation, an inter-message timing maximum, and a percentage of lost messages to received messages. Analyzing the set of performance parameters includes creating an instantaneous performance vector with multiple dimensions corresponding to message reception frequency, inter-message timing standard deviation, inter-message timing maximum, and a percentage of lost messages to received messages.

Determining the values for each dimension includes calculating the message reception frequency by taking the inverse of the average of inter-message timing values for the timeframe, calculating a standard deviation of the inter-message timing values and the inverse, and identifying the maximum inter-message value in the set of inter-message values in the timeframe. Determining the percentage of lost messages to received messages includes dividing the lost message count by the total received messages in the timeframe and multiplying that interim result by 100.

The method continues at step 1024, where the edge node predicts an estimated performance level of the subsequent sequence of data messages sourced by the data device, where the estimated performance level is based on the instantaneous performance level associated with a portion of the plurality of time frames. Predicting the estimated performance level of the subsequent sequence of data messages includes creating a prediction model based on a portion or the entire history of stored instantaneous performance levels.

A first approach to creating a predictive model includes calculating a linear regression equation for each dimension of the history of instantaneous performance levels (vectors), which would be retained in a storage memory, and utilizing the regression equation to calculate the future estimated performance level for any dimension of the performance vector. Alternative approaches to creating a predictive model include alternative regression models (logistic, etc.), neural networks models, and various other machine learning techniques.

The method continues at step 1026, where the edge node determines that the estimated performance level of the subsequent sequence of data messages sourced by the data device compares unfavorably to a desired performance level. The determining includes establishing an expected performance level for each vector parameter along with deviation tolerances, and comparing the estimated performance to the expected performance level to determine if the difference in the comparison exceeded the established deviation tolerances.

A first approach to establishing an expected performance level includes facilitating the data devices to send corresponding expected performance levels based on configuration at time of deployment, or after any reconfiguration event, and then storing these expected performance levels. A second approach to establishing an expected performance level includes collecting an appropriate amount of history for instantaneous performance levels for which the prediction model has achieved steady-state average performance values and acceptable deviation tolerance values.

The method continues at step 1028, where the edge node determines one or more corrective actions based on the estimated performance level and actual performance level information, where the corrective action may include at least one of rerouting data message, resetting the data device, reconfiguring the data device, and notifying at least some of the one or more cloud services. The determining the corrective actions include prioritizing the severity of the deviation assessment, speculating on possible causes of the deviation to identify whether data device or edge node network is most likely the cause, and choosing the one or more most appropriate corrective actions to implement.

Prioritizing the unfavorable performance events includes focusing on the largest deviations from tolerance, or prioritizing based on the priority assigned to the function of the data device, such as the performance required of a fire alarm may supersede that of a barometer. Speculating on the possible causes of the deviation include assigning likelihoods of specific failure modes for specific performance parameters to either data devices or edge node network elements. As an example, when poor message reception frequency performance is detected at a serving edge node (which has direct and initial connectivity to the data device), then most likely it is not the edge node network unless the edge node has received specific separate failure indication on that connectivity link.

Choosing the one or more appropriate corrective actions may include multiple approaches. A first approach includes performing a look up utilizing a table that maps unfavorable performance for specific parameters with specific corrective actions. For example, when the data device is determined as most likely at fault, then a corrective action of either resetting the device reconfiguring the device by having the edge node send the data device the reset or reconfiguration command, may be the best course of action.

In other approaches, the cloud service associated with the data device retains full control of the data device, and in further approaches the edge node may send the notification to reset or reconfigure the data device to the cloud service which controls the device, such that the cloud service initiates the command to the data device. For example, when message latency is estimated to exceed the desired tolerance based on the prediction model, then the edge node network is most likely at fault, and therefore a routing optimization implemented by the edge node that shortens the remaining network path to the destination cloud service, may be the best course of action to optimize and reduce the end-to-end latency.

The examples described above in conjunction with one or more processing modules of one or more computing devices can alternatively be performed by other modules of the proprietary network 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth memory section, a fifth memory element etc.) that stores operational instructions can, when executed by the one or more processing modules of the one or more computing devices of the proprietary network 10, cause the one or more computing devices to perform any or all of the examples described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c".

In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    editing, by a first computing entity, an entry in a first copy of a common responsibility list of a proprietary network, wherein the common responsibility list includes a plurality of entries, wherein the entry includes information regarding the first computing entity's service responsibility for a first user computing device, and wherein another entry in the common responsibility list includes information regarding another computing entity's service responsibility for another user computing device;
    sending, by the first computing entity, at least the edited entry to other computing entities;
    receiving, by the first computing entity, at least a second edited entry from a second computing entity; and
    updating, by the first computing entity, the first copy of the common responsibility list with the at least the second edited entry.

2. The method of claim 1 further comprises:
    receiving, by the second computing entity, user data from a data source device; and
    forwarding, by the second computing entity, the user data to the first computing entity when the edited entry indicates that the first computing entity's service responsibility includes forwarding the user data to the first user computing device.

3. The method of claim 1 further comprises:
    receiving, by the first computing entity, user data from the second computing entity; and
    forwarding, by the first computing entity, the user data to the first user computing device when the edited entry indicates that the first computing entity's service responsibility includes forwarding the user data to the first user computing device.

4. The method of claim 1, wherein the editing the entry in the first copy of the common responsibility list comprises:
    interpreting a subscription request from the first user computing device to produce a subscription interpretation, wherein the subscription request includes the information regarding the first computing entity's service responsibility for the first user computing device; and
    updating the entry to produce the updated entry by one of:
        adding the entry when the subscription interpretation indicates adding a new data subscription;
        deleting the entry when the subscription interpretation indicates deleting an existing data subscription; and
        modifying the entry when the subscription interpretation indicates modifying the existing data subscription.

5. The method of claim 1 further comprises:
    receiving, by the first computing entity, a second copy of the common responsibility list, wherein the second copy of the common responsibility list includes the at least the second edited entry;
    comparing, by the first computing entity, the first copy of the common responsibility list to the second copy of the common responsibility list;
    identifying, by the first computing entity, an inconsistent entry between the first copy of the common responsibility list and the second copy of the common responsibility list; and
    resolving, by the first computing entity, the inconsistent entry by one of:
        utilizing the inconsistent entry of the first copy of the common responsibility list over the inconsistent entry of the second copy of the common responsibility list;
        utilizing the inconsistent entry of the second copy of the common responsibility list over the inconsistent entry of the first copy of the common responsibility list;
        utilizing a common entry of a majority of the first copy of the common responsibility list, the second copy of the common responsibility list, and a third copy of the common responsibility list; and
        utilizing a source entry that includes information regarding a source computing entity's service responsibility for a corresponding user computing device associated with the inconsistent entry.

6. The method of claim 1 further comprises:
    receiving, by the second computing entity, the at least the edited entry from the first computing entity; and
    updating, by the second computing entity, a second copy of the common responsibility list with the at least the edited entry.

7. The method of claim 6 further comprises:
    receiving, by the second computing entity, the first copy of the common responsibility list;
    comparing, by the second computing entity, the first copy of the common responsibility list to the second copy of the common responsibility list, wherein the second copy of the common responsibility list includes the at least the second edited entry;
    identifying, by the second computing entity, an inconsistent entry between the first copy of the common responsibility list and the second copy of the common responsibility list; and
    resolving, by the second computing entity, the inconsistent entry by one of:
        utilizing the inconsistent entry of the first copy of the common responsibility list over the inconsistent entry of the second copy of the common responsibility list;
        utilizing the inconsistent entry of the second copy of the common responsibility list over the inconsistent entry of the first copy of the common responsibility list;
        utilizing a common entry of a majority of the first copy of the common responsibility list, the second copy of the common responsibility list, and a third copy of the common responsibility list; and
        utilizing a source entry that includes information regarding a source computing entity's service responsibility for a corresponding user computing device associated with the inconsistent entry.

8. A computing device comprises:
    an interface;
    a local memory; and a processing module operably coupled to the interface and the local memory, wherein the processing module functions to:

edit an entry in a first copy of a common responsibility list of a proprietary network, wherein the common responsibility list includes a plurality of entries, wherein the entry includes information regarding the computing device's service responsibility for a first user computing device, and wherein another entry in the common responsibility list includes information regarding another computing device's service responsibility for another user computing device;

send, via the interface, at least the edited entry to other computing devices;

receive, via the interface, at least a second edited entry from a second computing device; and update the first copy of the common responsibility list with the at least the second edited entry.

9. The computing device of claim 8, wherein the processing module further functions to:

receive, via the interface, user data from a data source device; and forward, via the interface, the user data to the second computing device when the second edited entry indicates that the second computing device's service responsibility includes forwarding the user data to a second user computing device.

10. The computing device of claim 8, wherein the processing module further functions to:

receive, via the interface, user data from the second computing device; and forward, via the interface, the user data to the first user computing device when the edited entry indicates that the computing device's service responsibility includes forwarding the user data to the first user computing device.

11. The computing device of claim 8, wherein the processing module functions to edit the entry in the first copy of the common responsibility list by:

interpreting a subscription request from the first user computing device to produce a subscription interpretation, wherein the subscription request includes the information regarding the computing device's service responsibility for the first user computing device; and updating the entry to produce the updated entry by one of:
adding the entry when the subscription interpretation indicates adding a new data subscription;
deleting the entry when the subscription interpretation indicates deleting an existing data subscription; and
modifying the entry when the subscription interpretation indicates modifying the existing data subscription.

12. The computing device of claim 8, wherein the processing module further functions to:

receive, via the interface, a second copy of the common responsibility list, wherein the second copy of the common responsibility list includes the at least the second edited entry;

compare the first copy of the common responsibility list to the second copy of the common responsibility list;

identify an inconsistent entry between the first copy of the common responsibility list and the second copy of the common responsibility list; and resolve the inconsistent entry by one of:

utilizing the inconsistent entry of the first copy of the common responsibility list over the inconsistent entry of the second copy of the common responsibility list;

utilizing the inconsistent entry of the second copy of the common responsibility list over the inconsistent entry of the first copy of the common responsibility list;

utilizing a common entry of a majority of the first copy of the common responsibility list, the second copy of the common responsibility list, and a third copy of the common responsibility list; and utilizing a source entry that includes information regarding a source computing device's service responsibility for a corresponding user computing device associated with the inconsistent entry.

13. A computer readable memory comprises:

a first memory element that stores operational instructions that, when executed by a processing module, causes the processing module to:

edit an entry in a first copy of a common responsibility list of a proprietary network, wherein the first copy of a common responsibility list is held by a first computing entity, wherein the common responsibility list includes a plurality of entries, wherein the entry includes information regarding the first computing entity's service responsibility for a first user computing device, and wherein another entry in the common responsibility list includes information regarding another computing entity's service responsibility for another user computing device;

a second memory element that stores operational instructions that, when executed by the processing module, causes the processing module to:

send at least the edited entry to other computing entities; and receive at least a second edited entry from a second computing entity; and a third memory element that stores operational instructions that, when executed by the processing module, causes the processing module to:

update the first copy of the common responsibility list with the at least the second edited entry.

14. The computer readable memory of claim 13 further comprises:

a fourth memory element that stores operational instructions that, when executed by the processing module, causes the processing module to:

receive user data from a data source device; and forward the user data to the first computing entity when the edited entry indicates that the first computing entity's service responsibility includes forwarding the user data to the first user computing device.

15. The computer readable memory of claim 13 further comprises:

a fifth memory element that stores operational instructions that, when executed by the processing module, causes the processing module to:

receive user data from the second computing entity; and forward the user data to the first user computing device when the edited entry indicates that the first computing entity's service responsibility includes forwarding the user data to the first user computing device.

16. The computer readable memory of claim 13, wherein the processing module functions to execute the operational instructions stored by the first memory element to cause the processing module to edit the entry in the first copy of the common responsibility list by:

interpreting a subscription request from the first user computing device to produce a subscription interpretation, wherein the subscription request includes the information regarding the first computing entity's service responsibility for the first user computing device; and updating the entry to produce the updated entry by one of:

adding the entry when the subscription interpretation indicates adding a new data subscription;

deleting the entry when the subscription interpretation indicates deleting an existing data subscription; and modifying the entry when the subscription interpretation indicates modifying the existing data subscription.

17. The computer readable memory of claim 13 further comprises:

a sixth memory element that stores operational instructions that, when executed by the processing module, causes the processing module to:

receive a second copy of the common responsibility list, wherein the second copy of the common responsibility list includes the at least the second edited entry;

compare the first copy of the common responsibility list to the second copy of the common responsibility list;

identify an inconsistent entry between the first copy of the common responsibility list and the second copy of the common responsibility list; and resolve the inconsistent entry by one of:

utilizing the inconsistent entry of the first copy of the common responsibility list over the inconsistent entry of the second copy of the common responsibility list;

utilizing the inconsistent entry of the second copy of the common responsibility list over the inconsistent entry of the first copy of the common responsibility list;

utilizing a common entry of a majority of the first copy of the common responsibility list, the second copy of the common responsibility list, and a third copy of the common responsibility list; and utilizing a source entry that includes information regarding a source computing entity's service responsibility for a corresponding user computing device associated with the inconsistent entry.

18. The computer readable memory of claim 13 further comprises:

a seventh memory element that stores operational instructions that, when executed by the processing module, causes the processing module to:

receive the at least the edited entry from the first computing entity; and update a second copy of the common responsibility list with the at least the edited entry.

19. The computer readable memory of claim 18 further comprises:

the seventh memory element further stores operational instructions that, when executed by the processing module causes the processing module to:

receive the first copy of the common responsibility list;

compare the first copy of the common responsibility list to the second copy of the common responsibility list, wherein the second copy of the common responsibility list includes the at least the second edited entry;

identify an inconsistent entry between the first copy of the common responsibility list and the second copy of the common responsibility list; and resolve the inconsistent entry by one of:

utilizing the inconsistent entry of the first copy of the common responsibility list over the inconsistent entry of the second copy of the common responsibility list;

utilizing the inconsistent entry of the second copy of the common responsibility list over the inconsistent entry of the first copy of the common responsibility list;

utilizing a common entry of a majority of the first copy of the common responsibility list, the second copy of the common responsibility list, and a third copy of the common responsibility list; and utilizing a source entry that includes information regarding a source computing entity's service responsibility for a corresponding user computing device associated with the inconsistent entry.

\* \* \* \* \*